March 18, 1930.  J. TANTILLO  1,750,911
AIRCRAFT
Filed Nov. 3, 1928   3 Sheets-Sheet 1
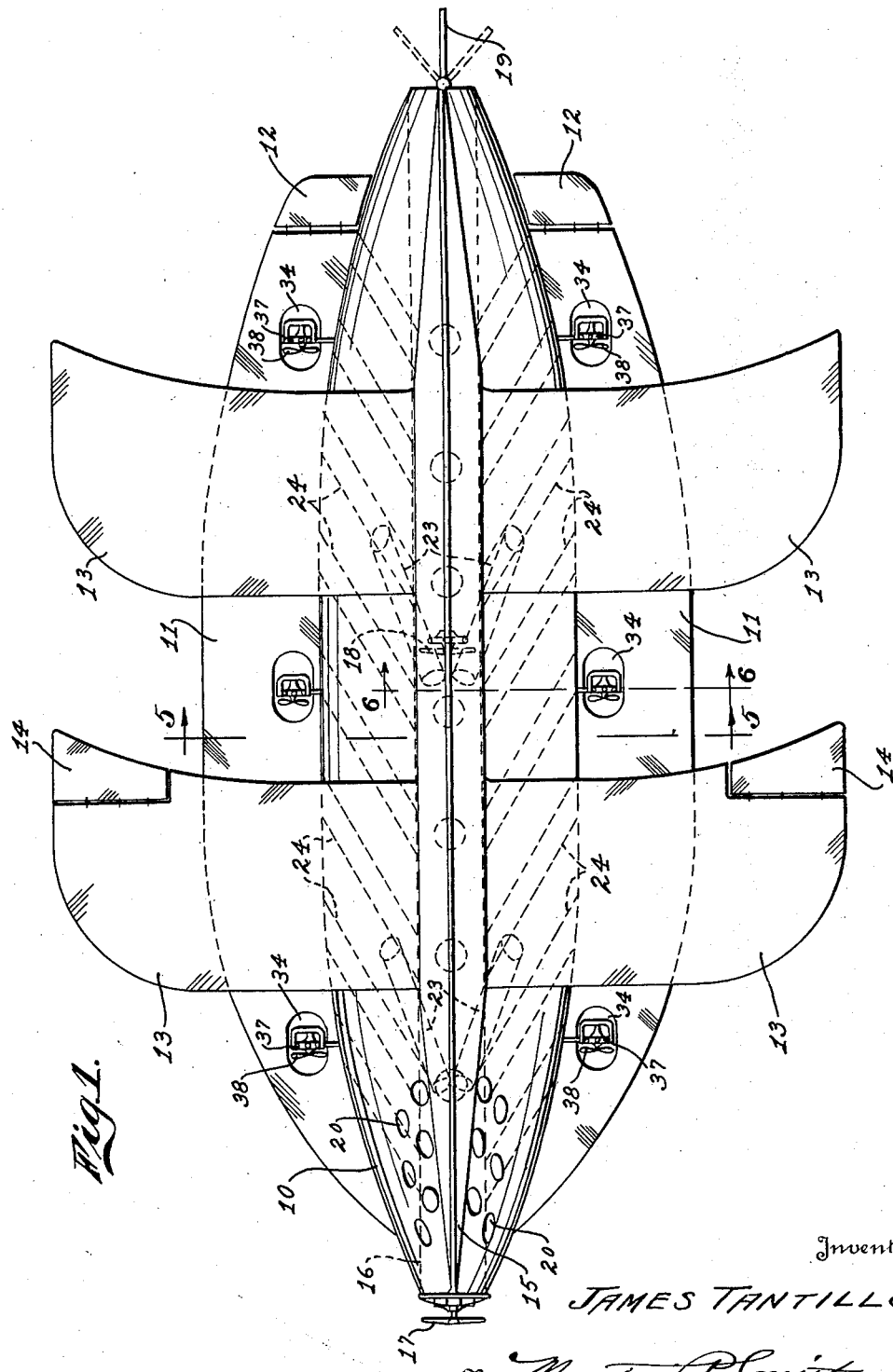

March 18, 1930.   J. TANTILLO   1,750,911
AIRCRAFT
Filed Nov. 3, 1928   3 Sheets-Sheet 2
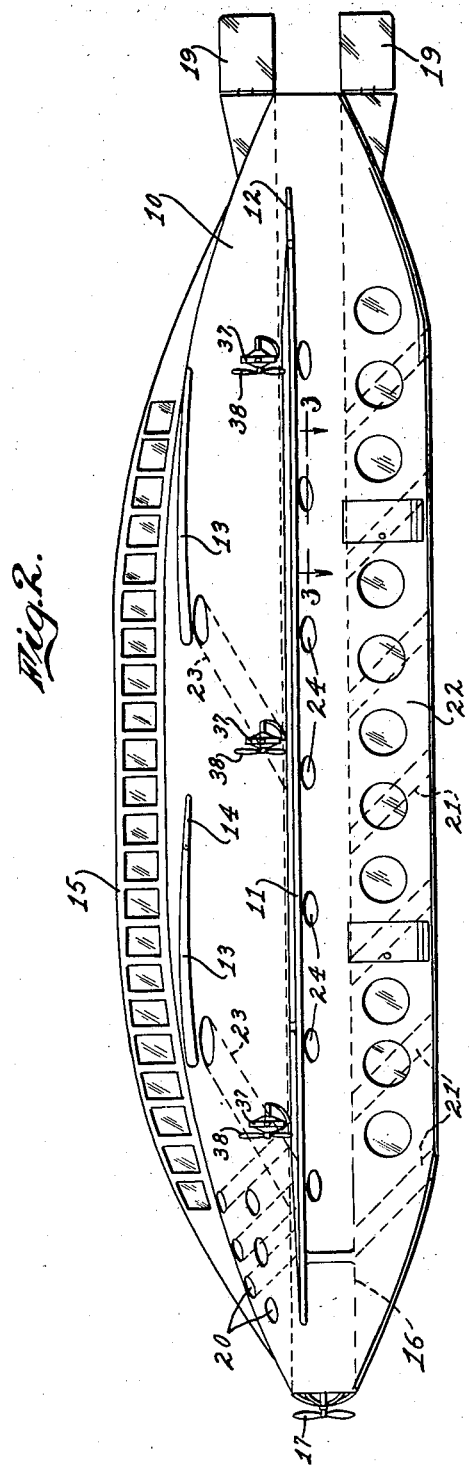
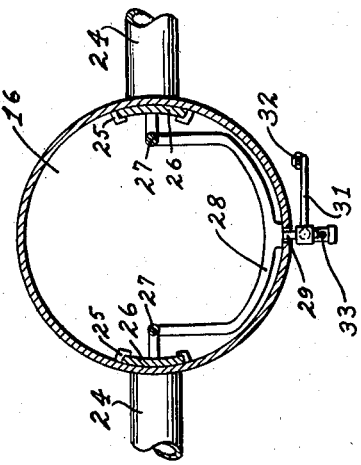
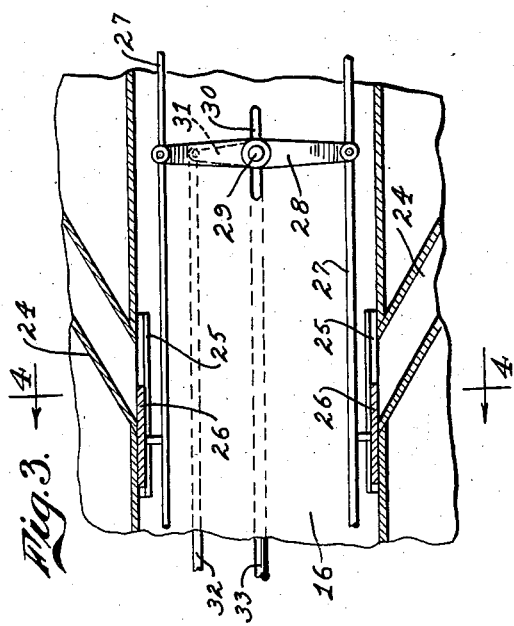
Inventor
JAMES TANTILLO.
By Martin P. Smith
Attorney March 18, 1930.  J. TANTILLO  1,750,911
AIRCRAFT
Filed Nov. 3, 1928  3 Sheets-Sheet 3
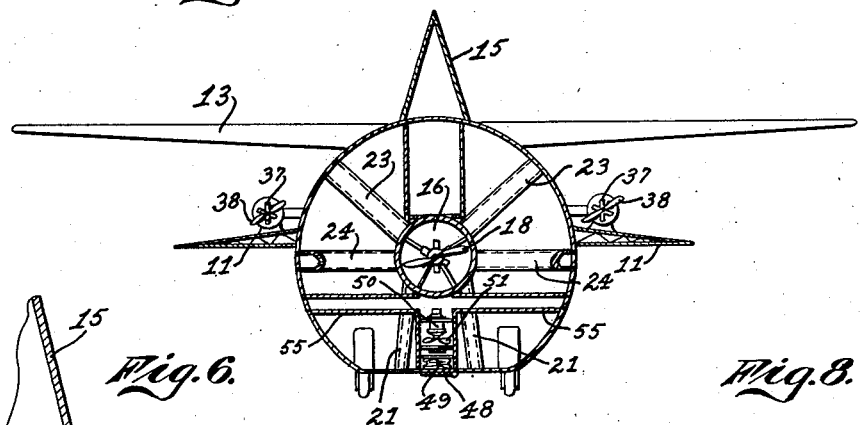
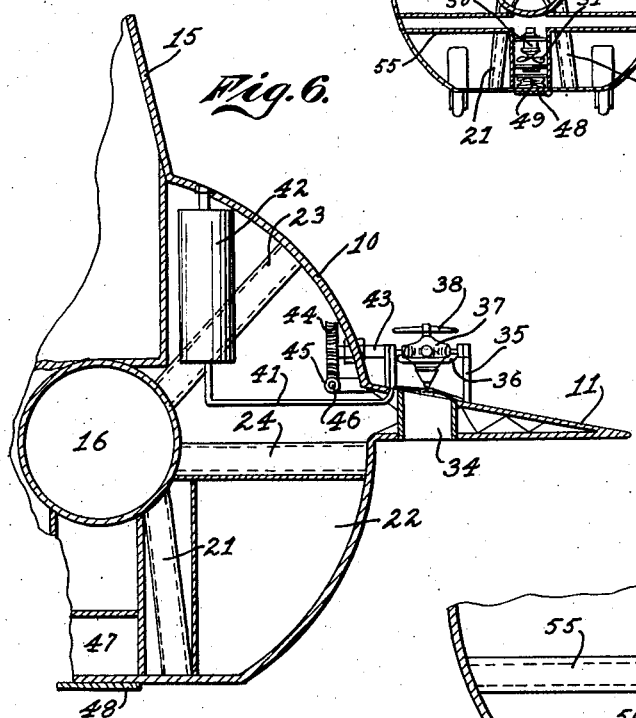
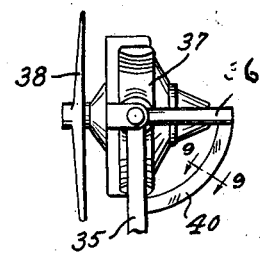
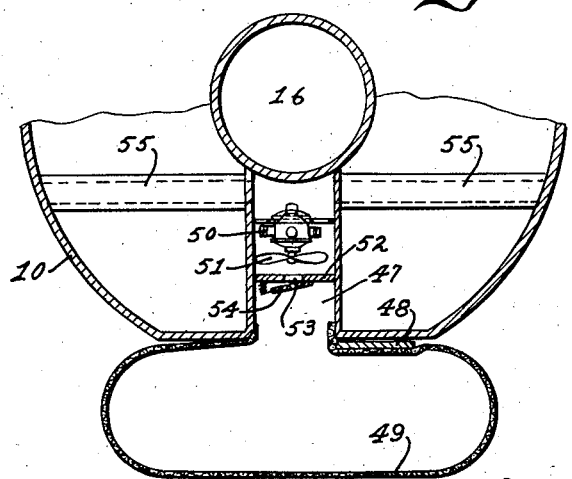
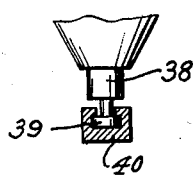
Inventor
JAMES TANTILLO
By Martin C. Smith
Attorney Patented Mar. 18, 1930

1,750,911

UNITED STATES PATENT OFFICE

JAMES TANTILLO, OF GLENDALE, CALIFORNIA, ASSIGNOR OF ONE-HALF TO FLORENCE E. GAINES, OF LOS ANGELES, CALIFORNIA

AIRCRAFT

Application filed November 3, 1928. Serial No. 316,889.

My invention relates to aircraft of the heavier-than-air type, and the principal objects of my invention are, to generally improve upon and simplify the construction of the existing forms of similar aircraft; to provide improved means for propelling the aircraft during flight, to provide an aircraft with improved and efficient stabilizing means, and, further, to provide simple and efficient means that will afford additional stability to the aircraft during those periods when the same is subjected to the greatest danger, namely, while the ship is arriving upon and leaving the surface of the earth.

Further objects of my invention are to provide an aircraft that is equipped with mobile propulsion units in order that the aircraft may be driven forwardly or upwardly and forwardly; further, to equip the aircraft with longitudinally disposed lateral and vertical fins or airfoils that will be effective in stabilizing the aircraft during flight; further, to arrange through the center of the body of the aircraft a tunnel through which air is driven under the influence of high speed propellers, which air stream is of material assistance in driving the aircraft forwardly or upwardly during flight; further, to extend branch tubes from the main central tunnel so as to discharge streams of air outwardly from the surface of the body of the craft so as to exert a lifting effect upon the aircraft while the same is arising from the ground or during flight, and further, to provide means arranged in the head or forward end of the aircraft that will tend to eliminate resistance during forward flight.

Further objects of my invention are, to provide simple and efficient means for controlling the flow of air from the main central tunnel outwardly through the branch tubes, and to arrange certain of the branch tubes so that they will discharge air streams directly beneath the lateral stabilizers and the wings that project outwardly from the body of the aircraft, and which arrangement produces a sustaining and lifting effect upon the air surfaces.

A further object of my invention is to arrange in the underside of the body of the aircraft an inflatable bag and to provide a fan or blower for effecting the rapid inflation of said bag, and which latter when inflated provides an air cushion for the aircraft when the same alights on the ground.

With the foregoing and other objects in view, my invention consists in certain novel features of construction and arrangement of parts that will hereinafter be more fully described and claimed and illustrated in the accompanying drawings, in which:

Fig. 1 is a top plan view of an aircraft embodying the principles of my invention.

Fig. 2 is a side elevational view of my improved aircraft.

Fig. 3 is an enlarged horizontal section taken approximately on the line 3—3 of Fig. 2.

Fig. 4 is a cross section taken approximately on the line 4—4 of Fig. 3.

Fig. 5 is a cross section taken approximately on the line 5—5 of Fig. 1.

Fig. 6 is an enlarged cross section taken approximately on the line 6—6 of Fig. 1.

Fig. 7 is an enlarged cross section showing the inflatable bag that is arranged in the lower portion of the body of the aircraft with said bag inflated in order to provide a pneumatic cushion for the body of the ship when the same contacts with the ground.

Fig. 8 is an enlarged side elevational view of one of the driving propellers and its adjustable mounting.

Fig. 9 is an enlarged cross section taken approximately on the line 9—9 of Fig. 8.

Referring by numerals to the accompanying drawings which illustrate a practical embodiment of my invention, 10 designates an elongated substantially cylindrical structure that forms the body of the aircraft; said body being stream lined and constructed of a suitable framework, preferably lightweight metal, covered with sheets of lightweight metal, such as aluminum.

Rigidly fixed to and extending laterally from the central portions of the sides of the body 10 are longitudinally disposed planes 11, the forward ends of which are curved inwardly to correspond with the tapered forward end of the body 10, and arranged at the rear ends of the planes 10 are elevators 12.

Fixed to and extending outwardly from the upper central portion of the body 10 are wings 13 of the type generally used on airplanes and arranged on the rear edges of the outer ends of these wings are ailerons 14 of standard construction and which are provided with suitable controls (not shown).

Formed on top of the body 10 is a longitudinally disposed structure 15 that is of inverted V-shape in cross section and said structure functions as a stabilizer and a cabin or storage space. Both ends of this combined stabilizer and cabin structure are stream lined and said ends are extended downwardly on the upper surface of the tapered ends of the body, thus providing a complete stream line construction.

Extending axially through the body 10 is a tube or tunnel 16 and supported at or near the forward end of this tunnel is a motor driven propeller or fan 17, which, during operation, develops an air stream of considerable force and blows the same longitudinally through the tunnel.

Located at an intermediate point in said tunnel is a second motor driven propeller 18 which assists the propeller 17 in forcing the air stream through the tunnel.

Located at the rear end of the body 10, preferably directly above and below the end of the tunnel, are rudders 19 that are mounted to swing laterally upon a vertical axis, said rudders being equipped with suitable controls (not shown).

Arranged in the upper portion of the tapered forward end of body 10 is a series of tubes 20, the upper ends of which open on the curved top surface of the tapered forward end and said tubes extend downwardly and rearwardly with their lower open ends communicating with the tunnel 16.

During flight of the aircraft a considerable volume of air enters and passes downwardly through these tubes 20 and discharges into the tunnel 16 and which arrangement greatly minimizes the head resistance afforded to the aircraft while the same is in flight.

Leading from the lower portion of the tunnel 16 downwardly and rearwardly are open ended tubes 21 which are effective in carrying streams of air from the tunnel 16 downwardly and rearwardly and discharging said air beneath the bottom of the body 10, thus materially aiding and lifting and driving propellers in sustaining the aircraft during flight.

In the event that rain, snow or the like enters the main tunnel 16 while the aircraft is in flight, such water or snow will discharge downwardly and rearwardly through the tubes 21. The tubes 21 are located equidistant from a vertical plane drawn through the axis of the aircraft, and the spaces 22 between these tubes 21 and the lower portions of the sides of the body 10 may be utilized as cabins or for the storage of cargo.

Leading from the tube 16 upwardly, rearwardly and outwardly are tubes 23, the open upper ends of which discharge at points beneath the front edges of the wings 13, and thus while the aircraft is in flight, streams of air of considerable pressure are discharged beneath the wings 13, thereby adding materially to the lifting and sustaining effect produced by said wings.

Leading from tube 16 rearwardly and outwardly are horizontally disposed tubes 24, the open outer ends of which discharge directly beneath the horizontal planes 11, thus delivering air streams beneath said planes to produce lifting and sustaining effects.

Arranged for longitudinal sliding movement in supports 25 that are arranged directly above and below the inner ends of the tubes 24, are plates 26 which function as valves to open and close the inner ends of the tubes 24, and these valves are connected to longitudinally disposed rods 27 that extend lengthwise within the tunnel 16.

Connecting the rods 27 at suitable intervals are transversely disposed yokes, such as 28, each yoke being provided with a centrally arranged depending pin 29 that extends through a short longitudinally disposed slot 30 in the lower part of tube 16.

Fixed to the lower portion of pin 29 is the inner end of a crank arm 31, the outer end of which is pivotally connected to a longitudinally disposed operating rod 32.

Pivotally mounted on the lower end of pin 29 is a longitudinally disposed operating rod 33. By moving the rod 33 longitudinally, yoke 28 is moved bodily for a short distance longitudinally of the tunnel 16, thereby simultaneously shifting the valve plates 26 to open or close the inner ends of the tubes 24, or by shifting the operating rod 32 forwardly or rearwardly, the yoke 28 will be swung upon its axis so as to open or close the entire series of valve plates 26 on one side of the tunnel and correspondingly close or open the series of valve plates on the opposite side of the tunnel. As a result of this arrangement, the streams of air that are forcibly discharged immediately beneath the lateral plane 11 may be very accurately controlled.

Formed through the planes 11 near the front and rear ends thereof and at intermediate points thereon, are openings 34; and projecting upwardly from the plane to the sides of each opening are supports 35 in which are journaled trunnions that project outwardly from the sides of a cradle 36, and mounted for operation within each cradle is a motor 37, preferably of the internal combustion engine type.

Carried by one end of the motor shaft is a propeller 38, and projecting from the opposite end of the motor is a substantially T-shaped stud 39 that is arranged for sliding movement in an accurate channel-shaped member 40 that forms a part of the supporting framework 35, said channel being concentric with the axis of swinging movement of the motor 37 upon its trunnion.

As a result of this arrangement, each motor carrying its propeller 38 is mounted so that it may swing through an arc of 90° or so that the propeller may operate in a vertical plane to drive the aircraft forward or in a horizontal plane to lift the aircraft.

Each motor 37 is individually supplied with fuel through a supply tube 41 that leads from a tank 42, which latter is positioned within the body 10 in a plane above the motor, and as a result, the fuel is, under all conditions, fed by gravity to the motor.

In order to simultaneously shift the positions of the entire series of motors on each wing, the inner trunnions on the motor carrying cradle 36 on each wing are connected to short transversely disposed shafts 43 and secured on the inner ends of these shafts within the body 10 are worm wheels 44, that mesh with worms 45 carried by a longitudinally disposed shaft 46.

It will be understood that there are two of the shafts 46, one for the entire series of motors on each plane 11, and by rotating either shaft 46, the corresponding set of propeller carrying motors 37 may simultaneously swing downwardly or upwardly so as to drive the aircraft forwardly or upwardly as the case may be.

Formed in the intermediate central portion of the body 10 and at the bottom thereof is a chamber 47, the lower portion of which is normally closed by a downwardly swinging trap door 48 and adapted to be folded so as to occupy this chamber is a relatively large inflatable bag 49 formed of airtight fabric, preferably waterproof.

Arranged in the upper portion of chamber 47 is a motor 50 having a vertically disposed shaft that carries on its lower end a fan or propeller 51 and arranged in the chamber 47 immediately below this motor is a plate or partition 52 having an opening 53 that is controlled by a downwardly opening check valve 54.

Leading from the exterior of the body 10 inwardly to the upper portion of the chamber 47 or that portion occupied by the motor and its propeller are air inlet tubes 55.

The construction just described provides means for effecting comparatively rapid inflation of the bag 49 and which is utilized in the event the aircraft descends or drops to the earth under abnormal conditions.

During flight of my improved aircraft the same is driven forwardly by the pulling action exerted by the propellers 38 the same operating in vertical planes on horizontal axes or in slightly inclined vertical planes in order to move the aircraft forwardly and upwardly.

The position of the propellers 38 are regulated and controlled by the operation of the shafts 46 that carry worms 45 and which latter engage the worm wheels 44 on the shafts that are connected to the trunnions of the cradles carrying the propeller operating motors.

In the event that it is desired to cause the aircraft to move vertically when leaving the ground or during flight, the motor carrying cradles are shifted so that the axes of the shafts carrying the propellers 38 are vertically disposed and when so positioned the air drawn downwardly by the propellers will pass through the openings 34 in the planes 11 without resistance.

While the aircraft is in flight, the propellers 17 and 18 are operated at high speed with the result that a large column of air under pressure is forced lengthwise through the tunnel 16, said column of air discharging from the rear end of the airship between the rudders 19, and through reaction, this column of air exerts pressure to drive the aircraft forwardly during flight.

By proper manipulation of the connections 33 and 27 the valve plates 26 may be shifted into position so as to open the inner ends of the branch tubes 24 and columns of air under pressure will pass through said branch tubes and discharge from the open outer ends thereof directly beneath the stabilizing planes 11, thereby causing said planes to exert a lifting and sustaining effect upon the aircraft, and at the same time increasing the stabilizing effects produced by the longitudinally disposed planes 11.

During flight columns of air under pressure will pass upwardly and outwardly through the branch pipes 23 and said columns of air will discharge beneath the wings 13, thereby materially assisting said wings in sustaining the ship during flight.

During flight of the aircraft, the head resistance is materially decreased as a result of air entering and passing downwardly through the tubes 20 and which air enters the column of air that is being forced through the tunnel 16. A certain amount of the air flowing through the tunnel 16 will discharge downwardly and rearwardly through branch tubes 21, and the reaction produced by the air streams discharging from said tubes will exert lifting and driving effort upon the aircraft while the same is in flight.

Branch tubes 21 are especially effective when the plane is arising from the surface of a body of water, in which event the air discharging from the lower ends of the branch tubes 21 will produce an air disturbance between the lower portion of the body of the aircraft and the water upon which it rests, thereby enabling the aircraft to readily take off or arise from the surface of the water.

By proper manipulation of the rod 32, yoke 28 may be swung upon its axis so as to close or partially close the inner ends of tubes 24 on one side of the craft and correspondingly open the inner ends of the tubes on the other side, thus providing an effective control for the craft to assist in its lateral turning movements.

Through manipulation of the rod 33, the yoke 28 may be bodily moved backward or forward, thereby simultaneously shifting the valve plates 26 to open or close the inner ends of tube 24 and consequently controlling the volume of air that passes through the branch tubes 24.

The two sets of adjustably mounted motor driven propellers 38 are separately and respectively controlled by proper manipulation of the shafts 46 and the movements of the aircraft may be regulated and controlled by separate adjustment of the two sets of propellers.

Thus it will be seen that I have provided an aircraft of the heavier-than-air type that is propelled forwardly during flight by the action of a plurality of motor driven propellers, together with a column or stream of air that is forcibly driven through an axially disposed tunnel and the latter being provided with branches that deliver air under pressure beneath the wings and planes of the aircraft as well as beneath the body thereof, and which branch streams of air are highly effective in exerting lifting and sustaining action upon the aircraft while the same is in flight, and likewise while said craft is rising from the ground or the surface of a body of water or alighting thereupon.

A further desirable and advantageous feature of my invention is the provision of the horizontally disposed longitudinally extending stabilizing planes at the sides of the body of the aircraft and the inverted V-shaped stabilizer that is disposed on top of the body of the craft and which extends from end to end.

Additional stability to the craft is brought about by the control of the streams of air pressure that are discharged beneath the lateral stabilizers and this control is especially effective during the most dangerous time of air navigation, namely, while leaving and alighting on the earth's surface, at which times the disturbing influences of gravity, capillary attraction and normal friction incident to movement of the craft are at their peak, or at the points where they have the greatest effect.

While I have shown and described the body of the aircraft as being provided with a single axially disposed tunnel, it will be understood that in some instances it may be found desirable and advantageous to provide two or more longitudinally disposed tunnels and, further, if desired, the sliding valve plates may be utilized for controlling the flow of air through the branch tubes that lead downwardly from the main tunnel to the bottom of the aircraft and likewise for controlling the air that passes through the branch tubes that lead from the main tunnel outwardly to points beneath the lateral stabilizers and the wings.

It will be understood that minor changes in the size, form and construction of the various parts of my improved aircraft may be made and substituted for those herein shown and described without departing from the spirit of the invention, the scope of which is set forth in the appended claims.

I claim as my invention:

1. In an aircraft, a substantially cylindrical body tapered at both ends, a tunnel extending axially through said body, means for forcing air under pressure through said tunnel, longitudinally disposed stabilizing planes projecting laterally from the sides of said body, branch tubes leading from the tunnel outwardly and rearwardly and discharging at the sides of the body beneath the stabilizing planes, wings projecting laterally from the sides of the body above the lateral stabilizers, and branch tubes leading from the tunnel upwardly and outwardly and discharging at the sides of the body beneath the forward portions of said wings.

2. In an aircraft, a substantially cylindrical body tapered at both ends, a tunnel extending axially through said body, means for forcing air under pressure through said tunnel, longitudinally disposed stabilizing planes projecting laterally from the sides of said body, branch tubes leading from the tunnel outwardly and rearwardly and discharging at the sides of the body beneath the stabilizing planes, wings projecting laterally from the sides of the body above the lateral stabilizers, branch tubes leading from the tunnel upwardly and outwardly and discharging at the sides of the body beneath the forward portions of said wings, and a series of branch tubes leading downwardly and rearwardly from said tunnel and discharging on the underside of said body.

3. In an aircraft, a substantially cylindrical body, longitudinally disposed planes projecting laterally from the sides of said body, a vertically disposed stabilizer arranged on top of said body and extending longitudinally thereof, wings projecting laterally from the body between the lateral planes and the stabilizer at the top of said body, means for delivering air under pressure outwardly from the sides of said body beneath the lateral planes, and means for discharging air under pressure outwardly from said body beneath the forward portions of said wings.

4. In an aircraft, a substantially cylindrical body, tapered at both ends, longitudinally disposed stabilizing planes projecting laterally from the sides of said body, wings projecting laterally from the body above said planes, a vertically disposed stabilizer arranged on top of the body and extending longitudinally thereof, a tunnel extending axially through the body, means for forcing air under pressure through said tunnel, branch tubes leading from said tunnel and arranged to discharge air beneath the forward portions of the wings, branch tubes leading from said tunnel and adapted to discharge air beneath said stabilizing planes, branch tubes leading from the tunnel downwardly and rearwardly and adapted to discharge air beneath said body, and a series of tubes leading from the front upper portion of the body downwardly and rearwardly and communicating with said tunnel.

5. In an aircraft, a substantially cylindrical body tapered at both ends, longitudinally disposed stabilizing planes projecting laterally from the sides of said body, wings projecting laterally from the body above said plane, a vertically disposed stabilizer arranged on top of the body and extending longitudinally thereof, a tunnel extending axially through the body, means for forcing air under pressure through said tunnel, branch tubes leading from said tunnel and arranged to discharge air beneath the forward portions of the wings, branch tubes leading from said tunnel and adapted to discharge air beneath said stabilizing planes, branch tubes leading from the tunnel downwardly and rearwardly and adapted to discharge air beneath said body, a series of tubes leading from the front upper portion of the body downwardly and rearwardly and communicating with said tunnel, and independently operating adjustable motor driven propellers carried by said lateral stabilizing planes.

In testimony whereof I affix my signature.

JAMES TANTILLO.